United States Patent
Liu et al.

(10) Patent No.: US 10,877,317 B1
(45) Date of Patent: Dec. 29, 2020

(54) BACKLIGHT MODULE AND DISPLAY DEVICE

(71) Applicant: WUHAN CHINA STAR OPTOELECTRONICS TECHNOLOGY CO., LTD., Hubei (CN)

(72) Inventors: Hu Liu, Hubei (CN); Hua Gu, Hubei (CN)

(73) Assignee: WUHAN CHINA STAR OPTOELECTRONICS TECHNOLOGY CO., LTD., Hubei (CN)

(*) Notice: Subject to any disclaimer, the term of this patent is extended or adjusted under 35 U.S.C. 154(b) by 0 days.

(21) Appl. No.: 16/613,934

(22) PCT Filed: Sep. 23, 2019

(86) PCT No.: PCT/CN2019/107343
§ 371 (c)(1),
(2) Date: Nov. 15, 2019

(30) Foreign Application Priority Data

Jun. 17, 2019 (CN) .......................... 2019 1 0522755

(51) Int. Cl.
*G02F 1/13357* (2006.01)
*F21V 8/00* (2006.01)

(52) U.S. Cl.
CPC ..... *G02F 1/133605* (2013.01); *G02B 6/0031* (2013.01); *G02F 1/133608* (2013.01); *G02F 1/133615* (2013.01); *G02F 2202/28* (2013.01)

(58) Field of Classification Search
CPC ......... G02F 1/133605; G02F 1/133615; G02F 1/133608; G02B 6/0031; G02B 6/0091
See application file for complete search history.

(56) References Cited

U.S. PATENT DOCUMENTS

| 10,267,976 B1 * | 4/2019 | Zheng ................. G02B 6/0045 |
| 10,545,277 B2 * | 1/2020 | Kohsaka .............. G02B 6/0045 |
| 2019/0072822 A1 | 3/2019 | Sharp |
| 2019/0219756 A1 * | 7/2019 | Kawano ............... G02B 6/0091 |

FOREIGN PATENT DOCUMENTS

| CN | 101943353 A |   | 1/2011 |
| CN | 103423662 A |   | 12/2013 |
| CN | 207318772 U | * | 5/2018 |
| CN | 207318772 U |   | 5/2018 |
| CN | 108427228 A |   | 8/2018 |
| CN | 110031928 A |   | 7/2019 |

OTHER PUBLICATIONS

CN-207318772-U English machine translation retrieve from Espacenet (Year: 2018).*

* cited by examiner

*Primary Examiner* — Mariceli Santiago

(57) ABSTRACT

A backlight module and a display device are provided. A light reflection layer is disposed at a backlight side of a through-hole region. And the light reflection layer is disposed at an inner side of an iron frame. After a reflection surface (i.e., a first light-reflecting region) receiving light from a backlight source, the light is reflected to the backlight side of the through-hole to brighten the backlight side. The first light-reflecting region enables a relatively dark area of the backlight side to obtain stronger reflection light, and enables a relatively bright area of the backlight side to obtain weaker reflection light, so that a brightness is uniformly distributed after the backlight side being brightened, thereby achieving a brightening effect.

12 Claims, 4 Drawing Sheets

BACKLIGHT MODULE AND DISPLAY DEVICE

FIELD OF INVENTION

The present invention relates to the field of liquid crystal display techniques. In particular, the present invention relates to a backlight module and a display device.

BACKGROUND OF INVENTION

With the rapid development of display techniques, liquid crystal display modules put higher requirements on screen ratio. Associated components such as a camera or an earphone are installed in a central opening of the liquid crystal display module to effectively increase the screen ratio. Moreover, small and medium-sized liquid crystal display modules, such as mobile phones, tablets and notebooks, generally use side-illumination backlight sources.

Technical Problem

As shown in FIG. 1, a backlight side at an opening 4 position is bound to form a dark area 5 of a light source, and light in the dark area 5 is unevenly distributed, thereby affecting display effect of the liquid crystal screen.

In the prior art, the dark area 5 is eliminated by means of adjusting sizes and positions of screen dots of a light-guiding plate around the opening, but the technical difficulty is greater and the cost of the light-guiding plate is higher.

Therefore, it is necessary to provide a new backlight module and a display device to improve a stability of the backlight module, thereby solving the problem about the dark area of a side away from the light in the prior art.

SUMMARY OF INVENTION

An object of the present invention is to provide a backlight module and a display device. A dimming component is disposed at a backlight side of a through-hole region. After a first light-reflecting region receiving light from a backlight source, the light is reflected to the backlight side of the through-hole to brighten the backlight side.

The present invention provides a backlight module including a light-guiding plate, a backlight source disposed at a side of the light-guiding side, and a dimming component. An end of the light-guiding plate away from the backlight source is provided with at least one through-hole, and the through-hole includes a facing-light side toward the backlight source as well as a backlight side away from the backlight source. The dimming component is disposed at a side of the light-guiding plate away from the backlight source and corresponds to the backlight side of the through-hole.

Furthermore, the dimming component includes: a light reflection layer toward the backlight source, and the light reflection layer includes: at least one first light-reflecting region. The first light-reflecting region is disposed to correspond to the backlight side of the through-hole.

Furthermore, the light reflection layer further includes: at least one second light-reflecting region connected to the first light-reflecting region.

Furthermore, a reflectance of the first light-reflecting region is greater than a reflectance of the second light-reflecting region, and the reflectance of the first light-reflecting region progressively increases from both sides toward middle.

Furthermore, the backlight module further includes an iron frame and a plastic frame, and the plastic frame is embedded in inner sides of the iron frame. The iron frame and the plastic frame are used together to surround and define the light-guiding plate and the backlight source. The light reflection layer of the dimming component is disposed at an inner side of the plastic frame away from the backlight source.

Furthermore, the plastic frame is integrally formed with the light reflection layer of the dimming component.

Moreover, the inner side of the plastic frame away from the backlight source is provided with a recess, and the recess corresponds to the backlight side.

Moreover, the dimming component further includes: an adhesive layer disposed at a side of the light reflection layer the backlight source. The dimming component is adhered within the recess by the adhesive layer, and a depth of the recess is 0.05 mm to 0.3 mm.

Moreover, material of the light reflection layer includes silver or titanium dioxide.

The present invention further provides a display device including above backlight module.

Advantageous Effects

The present invention provides a backlight module and a display device. The dimming component is disposed at the backlight side of the through-hole region, and the light reflection layer of the dimming component is located at the inner side of the iron frame. After the light reflection layer (i.e, the first light-reflecting region) receiving the light from the backlight source, the light is reflected to the backlight side of the through-hole to brighten the backlight side. The first light-reflecting region enables a relatively dark area of the backlight side to obtain stronger reflection light, and enables a relatively bright area of the backlight side to obtain weaker reflection light, so that a brightness is uniformly distributed after the backlight side being brightened, thereby achieving a brightening effect on the dark area of the backlight side.

DESCRIPTION OF DRAWINGS

In order to more clearly illustrate technical solutions in embodiments of the present invention, the drawings required for using in the description of the embodiments will be briefly described below. Obviously, the drawings in the following description are only some of the embodiments of the present invention. For ordinary technicians in the art, other drawings may also be obtained from these drawings without paying for creative labor.

Figure 1:
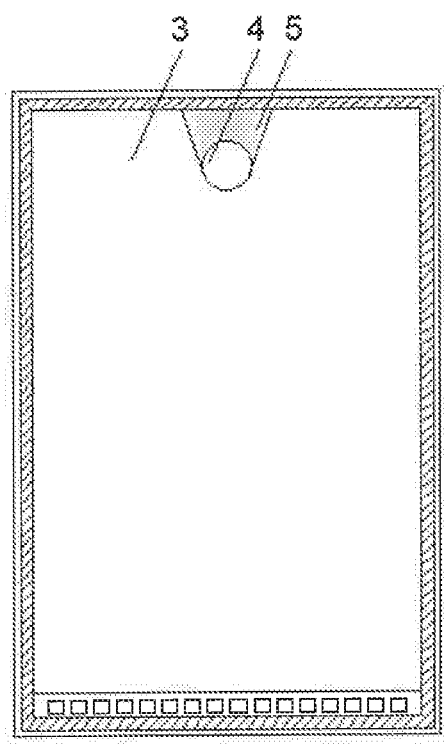
FIG. 1 is a structural schematic view of a backlight module in the prior art.

backlight module 100, 100a, 100b; dimming component 10; through-hole region 120; backlight source 104, 104a, 104b; facing-light side 1201; backlight side 1202; light reflection layer 101, 101a, 101b; first light-reflecting region 1011; second light-reflecting region 1012; plastic frame 105, 105a, 105b; recess 106b; adhesive layer 107b

DETAILED DESCRIPTION OF PREFERRED EMBODIMENTS

Referring to the accompanying drawings, the description of following embodiments is provided to illustrate the specific embodiment practiced by the present invention. Directional terms described by the present invention, such as upper, lower, front, back, left, right, inner, outer, side, etc., are only directions by referring to the accompanying drawings. Terms of elements mentioned in the present invention, such as first, second, etc., are only distinguishing between different parts and can be preferably expressed. In the drawings, structurally similar units are denoted by the same reference numerals.

The embodiments of the present invention will be described in detail herein with reference to the drawings. The present invention may be represented in many different forms and should not be only construed as being limited to the specific embodiments illustrated herein. The embodiments of the present invention are provided to be construed as the practical application of the present invention, and thereby technicians in the art can understand various embodiments of the present invention and various modifications suitable for the particularly expected application.

A First Embodiment

Figure 2:
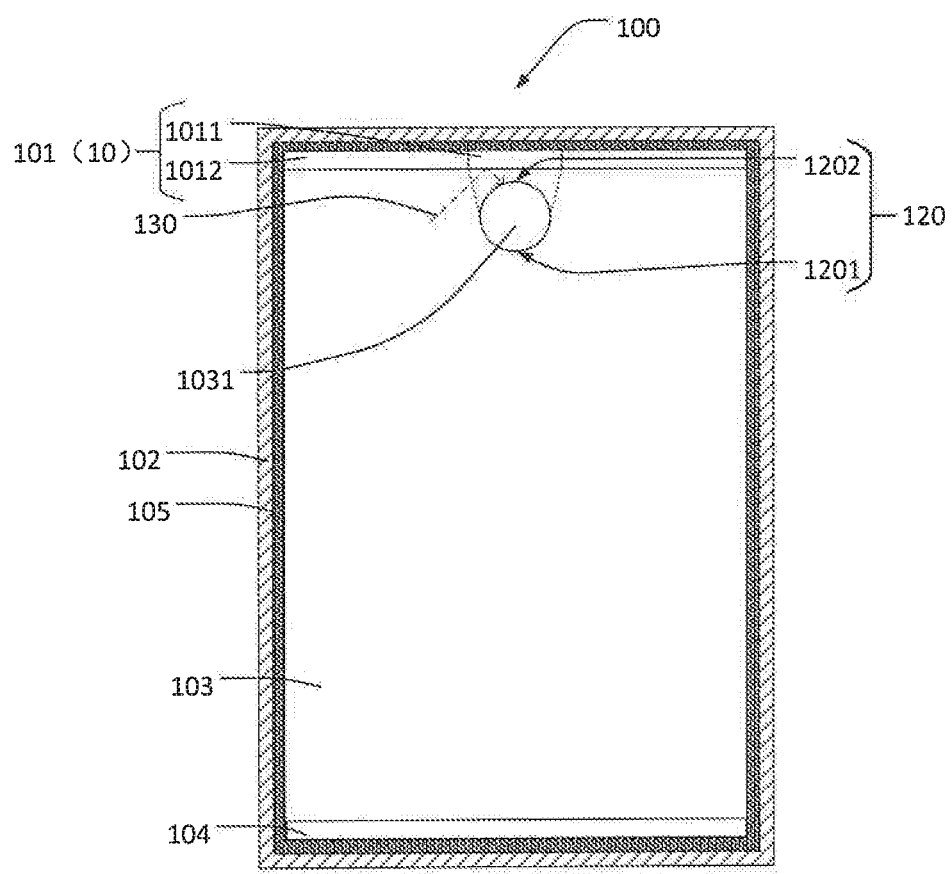
FIG. 2 is a structural schematic view of a backlight module provided by a first embodiment of the present invention.

As shown in FIG. 2, the first embodiment provides a backlight module 100 including a dimming component 10, an iron frame 102, a light-guiding plate 103, a backlight source 104, a plastic frame 105 and a through-hole region 120. The through-hole region 120 is disposed on the light-guiding plate 103, and a position of the through-hole region 120 generally corresponds to a position of a camera below a screen.

The position of the through-hole region 120 may be located at a middle of the light-guiding plate 103, and may also be located at both sides of the light-guiding plate 103.

The backlight source 104 is disposed at a side of the light-guiding plate 103, and away from the through-hole region 120. The backlight source 104 is a side-edge light-emitting diode (LED).

The through-hole region 120 includes a facing-light side 1201 toward the backlight source 104 and a backlight side 1202 away from the backlight source 104. The dimming component 101 is disposed at the other side of the light-guiding plate 103 parallel to the backlight source 104, and corresponds to the backlight side 1202.

The plastic frame 105 and the iron frame 102 surround and define the light-guiding plate 103. The light-guiding plate 103 is provide with a through-hole 1031 corresponding to the through-hole region 120.

A shape of the through-hole 1031 includes a circle, an ellipse, or other symmetric shapes.

In the embodiment, the dimming component 10 includes a light reflection layer 101, and material of the light reflection layer 101 includes material with a light-reflecting property such as silver or titanium dioxide.

The light reflection layer 101 is disposed at an inner side of the plastic frame 105 away from the backlight source 1101, and the light reflection layer 101 is parallel to the backlight source 1101, which is to say, the light reflection layer 101 and the backlight source 1101 are respectively located at opposite sides of the iron frame 102, thus facing each other, so that the light reflection layer 101 can reflects light 130 from the backlight source 1101 to the backlight side 1202 of the through-hole region 120.

Figure 3:
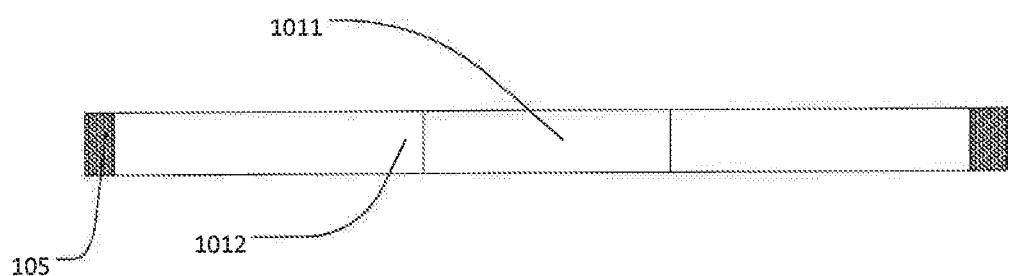
FIG. 3 is a schematic view of an inner structure of the backlight module provided by the first embodiment of the present invention, and the schematic view mainly shows a structure of a light reflection layer.

As shown in FIG. 3, the light reflection layer 101 is disposed at an end of the inner side of the plastic frame 105. In the embodiment, the light reflection layer 101 is actually formed by means of spraying, printing or vapor deposition on a conventional plastic frame 105. That is, the light reflection layer 101 is integrally manufactured with the plastic frame 105; specifically, together with the side of the plastic frame 105 away from the backlight source 104.

The light reflection layer 101 includes a first light-reflecting region 1011 and at least one second light-reflecting region 1012, and the first light-reflecting region 1011 corresponds to the backlight side 1202 of the through-hole region 120 (as seen in FIG. 2). In the embodiment, the light reflection layer 101 includes two second light-reflecting region 1012 symmetrically located on both sides of the first light-reflecting region 1011.

A reflectance of the first light-reflecting region 1011 is greater than a reflectance of the second light-reflecting region 1012, and the reflectance of the first light-reflecting region 1011 progressively increases from the both sides toward middle to form a graded reflection region.

In the embodiment, the graded reflectance of the first light-reflecting region 1011 can be set up according to a distribution of the light source on the backlight side 1202 obtained by means of experimental or computational simulation, and thereby the light source on the backlight side 1202 can be uniformly distributed.

The first embodiment further provides a display device including above backlight module and a display panel. The display panel is disposed on the backlight module.

In the embodiment, after the light reflection layer (i.e. the first light-reflecting region 1011), which is located at the backlight side 1202 of the through-hole 1031, receiving the light from the backlight source 104, the light is reflected to the backlight side 1202 of the through-hole 1031 to brighten the backlight side 1202. The first light-reflecting region 1011 enables the backlight side 1202 to obtain stronger reflected light. Moreover, because the reflectance of the first light-reflecting region 1011 progressively increases from the both sides toward the middle to form the graded reflection region, thus balancing a defect of the light unevenness on the backlight side 1202 of the through-hole 1031. For example, a relatively bright area at the both sides of the backlight side 1202 can obtain weaker reflection light, and a relatively dark area at the middle side of the backlight side 1202 can obtain stronger reflection light, so that a brightness is uniformly distributed after the backlight side 1202 being brightened, thereby achieving a brightening effect.

A Second Embodiment

Figure 4:
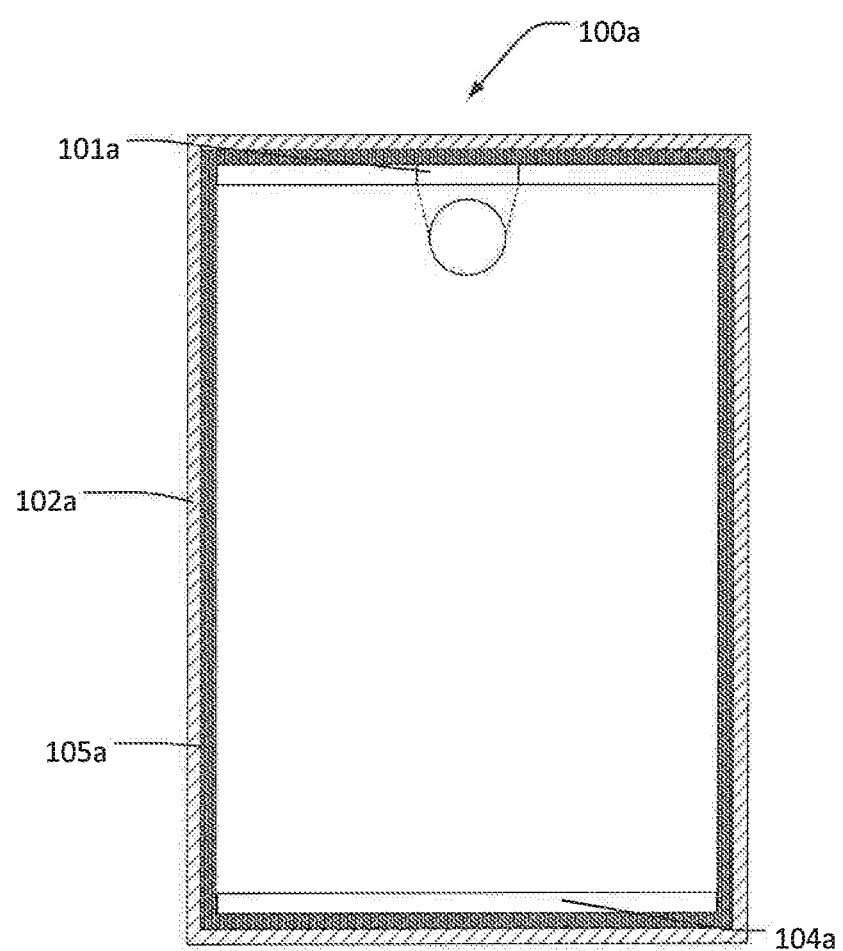
FIG. 4 is a structural schematic view of a backlight module provided by a second embodiment of the present invention.

As shown in FIG. 4, the second embodiment provides a backlight module 100a. The difference from the first embodiment is that the backlight module 100a provided by the second embodiment further includes a plastic frame 105a.

The plastic frame 105a is embedded in inner sides of the iron frame 102a, and the iron frame 102a can fix the plastic frame 105a.

The light reflection layer 101a is disposed at the inner side of the plastic frame 105a away from the backlight source 104a, and the light reflection layer 101a is parallel to and facing the backlight source 104a.

The light reflection layer 101a is actually formed on plastic material by means of spraying, printing, vapor deposition or multi-film layer combination. The light reflection layer 101a is placed at a height flush with the plastic frame 105a.

The plastic frame 105a is made of the plastic material, and its color is white, gray or black. The plastic frame 105a is integrally formed.

In comparison to the first embodiment, the light reflection layer 101a in the second embodiment is solely disposed on the inner side of the end of the plastic frame 105a, and it does not hinder the integral formation of the plastic frame 105a.

A Third Embodiment

Figure 5:
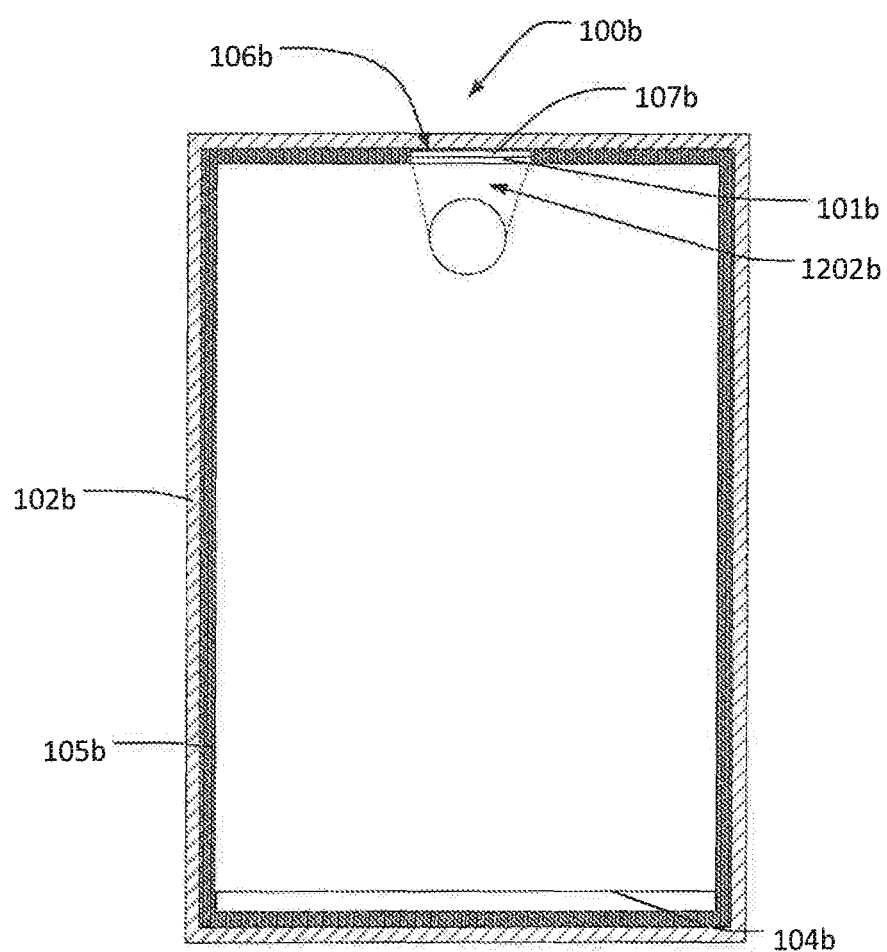
FIG. 5 is a structural schematic view of a backlight module provided by a third embodiment of the present invention.

As shown in FIG. 5, the third embodiment provides a backlight module 100b. The difference from the second embodiment is that the inner side of the plastic frame 105b away from the backlight source 104b provides with a recess 106b, and the recess 106b corresponds to the backlight side 1202b.

The light reflection layer 101b is disposed within the recess 106b. Specifically, the side of the light reflection layer 101b away from the backlight source 104b is provided with an adhesive layer 107b. The light reflection layer 101b is adhered within the recess 106b by the adhesive layer 107b.

The light reflection layer 101b is disposed within the recess 106b, and a depth of the recess 106b is 0.05 mm to 0.3 mm.

In the third embodiment, the side of the light reflection layer 101b is provided with the adhesive layer 107b, thus easily adhering. And the backlight module 100b is simple to assemble and low in cost.

The technical scope of the present invention is not only limited to the content of the description. The technicians in the art can make various modifications and alterations to the embodiments without departing from the technical spirit of the present invention, and all of the modifications and alterations are within the scope of the present invention.

What is claimed is:

1. A backlight module, comprising:
   a light-guiding plate;
   a backlight source disposed at a side of the light-guiding side;
   a dimming component;
   wherein an end of the light-guiding plate away from the backlight source is provided with at least one through-hole, and the through-hole includes a facing-light side toward the backlight source and a backlight side away from the backlight source;
   wherein the dimming component is disposed at a side of the light-guiding plate away from the backlight source, corresponds to the backlight side of the through-hole, and includes a light reflection layer toward the backlight source;
   wherein the light reflection layer includes at least one first light-reflecting region disposed to correspond to the backlight side of the through-hole and at least one second light-reflecting region connected to the first light-reflecting region; and
   wherein a reflectance of the first light-reflecting region is greater than a reflectance of the second light-reflecting region, and the reflectance of the first light-reflecting region progressively increases from both sides toward middle.

2. The backlight module according to claim 1, further comprising:
   an iron frame;
   a plastic frame embedded in inner sides of the iron frame;
   wherein the iron frame and the plastic frame are used together to surround and define the light-guiding plate and the backlight source; and
   wherein the light reflection layer of the dimming component is disposed at an inner side of the plastic frame away from the backlight source.

3. The backlight module according to claim 2, wherein the plastic frame is integrally formed with the light reflection layer of the dimming component.

4. The backlight module according to claim 2, wherein the inner side of the plastic frame away from the backlight source is provided with a recess, and the recess corresponds to the backlight side.

5. The backlight module according to claim 4, wherein the dimming component further includes an adhesive layer disposed at a side of the light reflection layer the backlight source, and the dimming component is adhered within the recess by the adhesive layer, wherein a depth of the recess is 0.05 mm to 0.3 mm.

6. The backlight module according to claim 1, wherein material of the light reflection layer includes silver or titanium dioxide.

7. A display device, comprising:
   a backlight module including:
      a light-guiding plate;
      a backlight source disposed at a side of the light-guiding plate;
      a dimming component;
   wherein an end of the light-guiding plate away from the backlight source is provided with at least one through-hole, and the through-hole includes a facing-light side toward the backlight source and a backlight side away from the backlight source;
   wherein the dimming component is disposed at a side of the light-guiding plate away from the backlight source, corresponds to the backlight side of the through-hole, and includes a light reflection layer toward the backlight source;
   wherein the light reflection layer includes at least one first light-reflecting region disposed to correspond to the backlight side of the through-hole and at least one second light-reflecting region connected to the first light-reflecting region; and
   wherein a reflectance of the first light-reflecting region is greater than a reflectance of the second light-reflecting region, and the reflectance of the first light-reflecting region progressively increases from both sides toward middle.

8. The display device according to claim 7, further comprising:
   an iron frame;
   a plastic frame embedded in inner sides of the iron frame;
   wherein the iron frame and the plastic frame are used together to surround and define the light-guiding plate and the backlight source; and
   wherein the light reflection layer of the dimming component is disposed at an inner side of the plastic frame away from the backlight source.

9. The display device according to claim 8, wherein the plastic frame is integrally formed with the light reflection layer of the dimming component.

10. The display device according to claim 8, wherein the inner side of the plastic frame away from the backlight source is provided with a recess, and the recess corresponds to the backlight side.

11. The display device according to claim 10, wherein the dimming component further includes an adhesive layer disposed at a side of the light reflection layer the backlight source, and the dimming component is adhered within the recess by the adhesive layer, wherein a depth of the recess is 0.05 mm to 0.3 mm.

12. The display device according to claim 7, wherein material of the light reflection layer includes silver or titanium dioxide.

\* \* \* \* \*